F. CONRAD.
PRESSURE GAGE.
APPLICATION FILED JUNE 9, 1910.
1,150,016.
Patented Aug. 17, 1915.
Fig.1.
Fig.2.
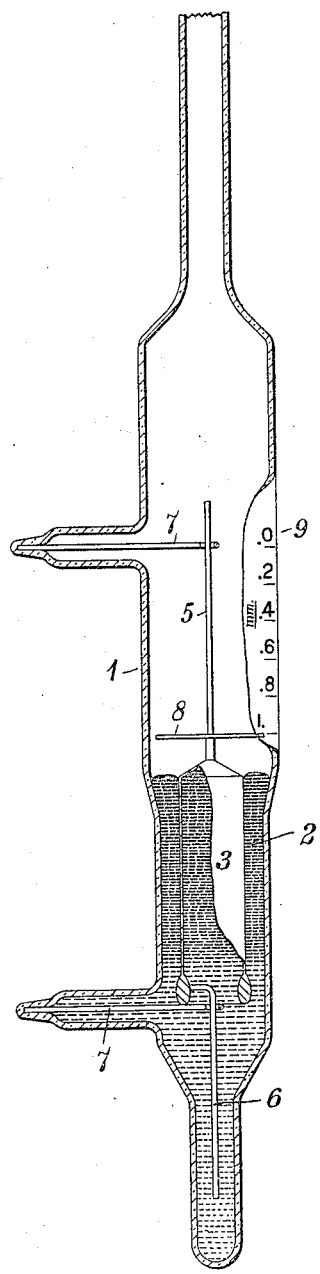
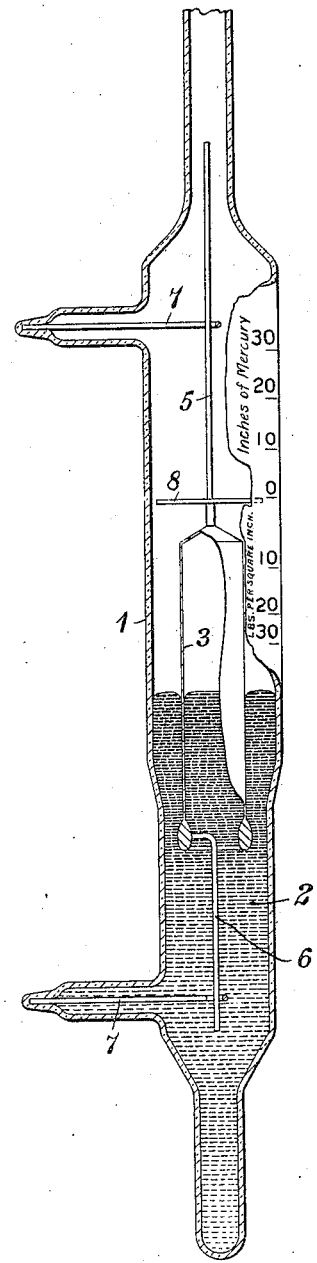
WITNESSES:
C. L. Belcher
Otto S. Schairer
INVENTOR
Frank Conrad
BY
Wesley G. Carr
ATTORNEY

UNITED STATES PATENT OFFICE.

FRANK CONRAD, OF PITTSBURGH, PENNSYLVANIA, ASSIGNOR TO WESTINGHOUSE ELECTRIC AND MANUFACTURING COMPANY, A CORPORATION OF PENNSYLVANIA.

PRESSURE-GAGE.

1,150,016.  Specification of Letters Patent.  Patented Aug. 17, 1915.

Application filed June 9, 1910. Serial No. 566,105.

*To all whom it may concern:*

Be it known that I, FRANK CONRAD, a citizen of the United States, and a resident of Pittsburgh, in the county of Allegheny and State of Pennsylvania, have invented a new and useful Improvement in Pressure-Gages, of which the following is a specification.

My invention relates to pressure gages, and it has for its object to provide a gage which is particularly useful for the measurement of very low pressures, such as the degree of vacuum in a chamber but which may be employed for measuring pressures of any kind and degree.

Figure 1 of the accompanying drawing is a side and sectional view of a gage that is adapted to measure pressures which are less than atmospheric pressure, and Fig. 2 is a similar view of a gage that is adapted to measure pressures which are either above or below atmospheric pressure.

The gage comprises a glass tube or receptacle 1 that is closed, at its lower end, and is adapted to be connected, at its upper end, to the receptacle or chamber the pressure in which it is desired to measure. The receptacle is partially filled with a suitable liquid 2, such as mercury, in which is immersed a shell or hollow body 3 that is closed at its upper end, and open at its lower end, and is preferably composed of material having a slightly less specific gravity than mercury or other liquid in which it is immersed, such, for instance, as a suitable combination of iron and platinum. The main portion of the shell 3 is very thin, and the lower end is relatively thick, in order that the changes in the amount of mercury which is displaced, as the shell rises and sinks therein, may be small, as compared with the total amount that is displaced.

Extending vertically from the respective ends of the shell 3 are rods 5 and 6 that are surrounded by loops on the free ends of wires 7, the other ends of which are sealed in the walls of the receptacle 1, the said wires serving to maintain the shell central within the tube or receptacle and to guide it in its movements. The rod or extension 5 carries a disk 8, or other suitable indicating device, that projects adjacent to a suitably calibrated scale 9 which is attached to, or marked upon, the walls of the receptacle 1.

In order to adapt the gage to the measurement of pressures which are less than atmospheric pressure, for which purpose it is particularly useful, the shell 3 should be completely filled with mercury at atmospheric pressure, as shown in Fig. 1, in which case, the indicator 8 will rest adjacent to the 1. millimeter mark upon the scale, since the lower end of the body rests upon the lower guide wire 7. If the gage is connected, at its upper end, to a chamber in which the pressure is less than atmospheric pressure, the pressure upon the outside of the shell 3 is also less than atmospheric pressure. Accordingly, on account of the difference in the specific gravities of the mercury and the shell, the shell will rise until the pressures within and without it have equalized or become the same, the degree to which it rises depending, of course, upon the pressure in the upper part of the receptacle 1. This pressure will be indicated upon the scale 9 by means of the disk 8 that is carried by the shell 3. The shell 3 extends somewhat above the mercury outside of it and to such an extent that it will not rise until the pressure in the upper part of the receptacle 1 has fallen to an absolute value of 1 millimeter of mercury, and the scale 9 is, accordingly, graduated in fractions of a millimeter of mercury of absolute pressure.

The shell and its attached parts should weigh only slightly less than the amount of mercury that is displaced by the immersed portion of the shell when the indicator 8 is at the zero mark of the scale, and, in order to provide a long scale, the portion of the shell that moves into and out of the mercury should be very thin, so that a considerable movement thereof is necessary to materially change the volume of mercury displaced thereby. When the indicator 8 is at the 1 mm. mark of the scale, there is a difference of 1 millimeter in the heights of the mercury within and without the shell, and when the indicator is at the zero mark, the mercury is of the same height within and without the shell, while the difference in the heights varies between those limits for the several different degrees of vacua.

If it is desired to employ the gage for the purpose of measuring pressures both above and below atmospheric pressure, a suitable amount of air should be admitted to the shell 3, as indicated in Fig. 2, in order that the said body may be caused to sink deeper into the liquid when the pressure in the upper part of the receptacle is greater than atmospheric pressure. The principle of operation of the gage of Fig. 2 is exactly the same as that of Fig. 1, since, when the pressure in the receptacle 1 is below atmospheric pressure, the shell 3 will rise until the pressures within and without are the same, and when the pressure in the receptacle 1 is greater than atmospheric pressure, the air within the shell will be compressed and the body will sink until the pressures within and without are the same. The zero of the scale will, of course, in this case, be at the middle or other intermediate point thereof, and, for convenience, the upper part of the scale is graduated in inches of mercury, and the lower part is graduated in pounds of pressure per square inch, as is usual with gages employed for like purposes.

I claim as my invention:

1. A pressure gage comprising a receptacle, a liquid contained therein, an inverted cup-shaped body having its open end extending into the liquid and its other end cut off from external communication, the said body having a slightly less specific gravity than the liquid, and means for applying the pressure to be measured to the surface of said liquid and to the exposed surface of said body.

2. A pressure gage comprising a receptacle, a liquid contained therein, an inverted cup-shaped body having its open end extending into the liquid and its other end cut off from external communication, the said body being filled with the liquid at a given pressure, and means for applying the pressure to be measured to the surface of said liquid and to the exposed surface of said body.

3. A pressure gage comprising a receptacle, a liquid contained therein, an inverted cup-shaped body having its open end extending into the liquid and its other end cut off from external communication, the said body being filled with the liquid at a given pressure and having a slightly less specific gravity than the liquid, and means for applying the pressure to be measured to the surface of said liquid and to the exposed surface of said body.

4. A pressure gage comprising a receptacle, a liquid contained therein, an inverted cup-shaped body having its open end extending into the liquid and its other end cut off from external communication, the main portion of the said body being thin and its lower end being relatively thick, and means for applying the pressure to be measured to the surface of said liquid and to the exposed surface of said body.

5. A gage comprising a receptacle, a pool of mercury contained therein, an inverted cup-shaped body having its open end extending into the mercury and its other end cut off from external communication, the said body being filled with mercury at a given pressure, and means for applying the pressure to be measured to the surface of said mercury and to the exposed surface of said body.

6. A gage comprising a receptacle, a pool of mercury contained therein, an inverted cup-shaped body having its open end extending into the mercury and its other end cut off from external communication, the said body being filled with mercury at atmospheric pressure, and means for applying the pressure to be measured to the surface of said mercury and to the exposed surface of said body.

7. A gage comprising a receptacle, a liquid contained therein, an inverted cup-shaped body having its open end extending into the mercury and its other end cut off from external communication, the portion of the body that moves into and out of the liquid being thin, and means for applying the pressure to be measured to the surface of said liquid and to the exposed surface of said body.

8. A pressure gage comprising a receptacle, a liquid contained therein, an inverted cup-shaped body having its open end extending into the liquid and its other end cut off from external communication, the said body having a slightly less specific gravity than the liquid and being filled with the liquid at a given pressure, the portion of the body that moves into and out of the liquid being thin relatively to the portion that remains in the liquid, and means for applying the pressure to be measured to the surface of said liquid and to the exposed surface of said body.

In testimony whereof, I have hereunto subscribed my name this 26th day of May, 1910.

FRANK CONRAD.

Witnesses:
 PAUL MACGAHAN
 B. B. HINES.